(12) United States Patent
Arab-Sadeghabadi et al.

(10) Patent No.: US 6,744,965 B2
(45) Date of Patent: Jun. 1, 2004

(54) PRESSURE VESSEL

(75) Inventors: Akbar Arab-Sadeghabadi, Simi Valley, CA (US); Agop H. Cherbettchian, Santa Monica, CA (US); Donald A. Frederick, Simi Valley, CA (US); Kurt R. Carlson, Simi Valley, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/733,748

(22) Filed: Dec. 7, 2000

(65) Prior Publication Data

US 2002/0064367 A1 May 30, 2002

Related U.S. Application Data

(60) Provisional application No. 60/221,815, filed on Jul. 31, 2000.

(51) Int. Cl.[7] .................................................. G02B 6/00
(52) U.S. Cl. .................... 385/147; 385/134; 385/137; 385/138; 385/139; 220/240; 220/361; 102/201
(58) Field of Search .................................. 385/147, 148

(56) References Cited

U.S. PATENT DOCUMENTS

| | | | |
|---|---|---|---|
| 2,547,521 A | 4/1951 | Buehler | |
| 3,344,912 A | 10/1967 | Sternau | |
| 3,358,902 A | 12/1967 | Emmert et al. | |
| 3,381,842 A | 5/1968 | Vayson | |
| 3,410,442 A | 11/1968 | Vayson | |
| 4,226,327 A | 10/1980 | Ballard | |
| 4,345,816 A | * 8/1982 | Nakai et al. | 174/70 S |
| 4,773,724 A | 9/1988 | Bjornlie | |
| 4,834,479 A | * 5/1989 | Adl | 385/138 |
| 6,212,989 B1 | * 4/2001 | Beyer et al. | 102/201 |

\* cited by examiner

*Primary Examiner*—Robert H. Kim
*Assistant Examiner*—George Y. Wang

(57) ABSTRACT

An improved pressure vessel comprises a tubular casing having an internal cavity and a first and second opening at each end. The internal cavity is divided into a first and second cylindrical plug region extending inward from the first and second opening and a hollow interior region. An optical component in the hollow interior has at least a plurality of optical fiber pigtails extending therefrom. A first and second cylindrical plug is force fit into the plug regions. At least one plug has a through-hole for receiving optical fiber pigtails. At least one plug has a ceramic adhesive plug formed by inserting adhesive into the through-hole and preferably filing the void space therein. The adhesive encapsulates the optical fibers passing through the through-hole. The plug has a channel machined into its outer circumference to receive an O-ring. A cap covers over and beyond the outer surface of the plug.

11 Claims, 4 Drawing Sheets

PRESSURE VESSEL

BACKGROUND OF THE PRESENT INVENTION

This non-provisional application is a formalization of an earlier filed provisional application 60/221,815 filed Jul. 31, 2000 and it claims priority therefrom. This application has identical inventors and a common assignee with the previously filed provisional application 06/221,815.

The present invention relates to pressure vessels used to protect electronic or fiber optical components use in connection with fiber optic arrays such as those used in connection with down hole drilling environments in which the vessel must withstand both extremely high pressure and high temperature.

Pressure vessels presently designed for oceanographic research under conditions of high hydrostatic pressure typically employ O-ring seals. Such seals are conventionally "piston" type or "compression" type seals. Such vessels have been employed to reach ocean depths such as the Mariana's Trench which is 36,000 feet deep. At such depths pressures of 18,000 psi must be accommodated. The design of the subject pressure vessel required that the pressure vessel withstand pressures in an oil well drill hole of 10,000 psi but with the added requirement of temperatures that reached 200 degrees centigrade. The package was required to protect an optical component at these temperatures. Fiber optic leads from the components had to be protected and permitted to extend through openings in the package.

At pressures as high as those required, water can wick into the interior of the pressure vessel containing the optical components to be protected. O-rings can be forced out of protected regions where gaps exist.

U.S. Pat Nos. 2,547,521; 3,381,842; and 3,410,442 show packages for use in withstanding high internal pressures. Since such vessels are adapted to withstand high internal pressures, they do not provide a solution for a package that will withstand high external pressures.

U.S. Pat. Nos. 3,344,912; 3,358,902 and 4,226,327 show the use of heat shrinkable materials used to seal end portions of packages (e.g. food containers) or to provide an outer covering for a package. They do not teach a solution for a package that is used at extremely high pressure and temperature.

BRIEF DISCRIPTION OF THE DRAWINGS

DETAILED DESCRIPTION OF THE INVENTION

Figure 1:
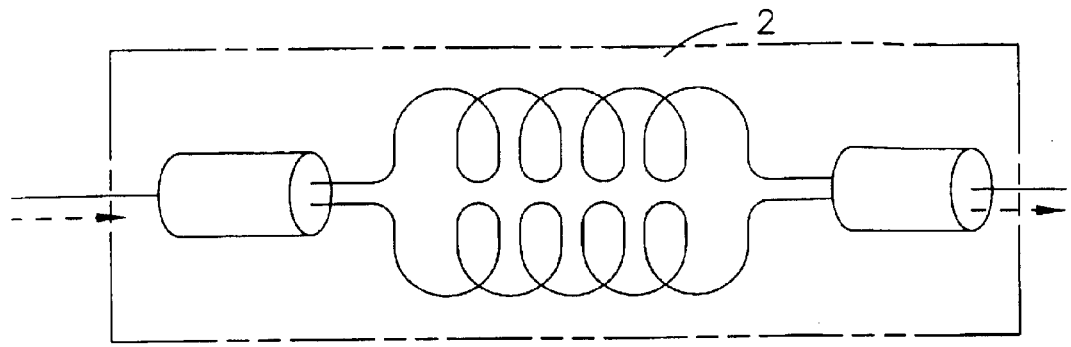
FIG. 1 is a schematic view of an interferometer.
Figure 2:
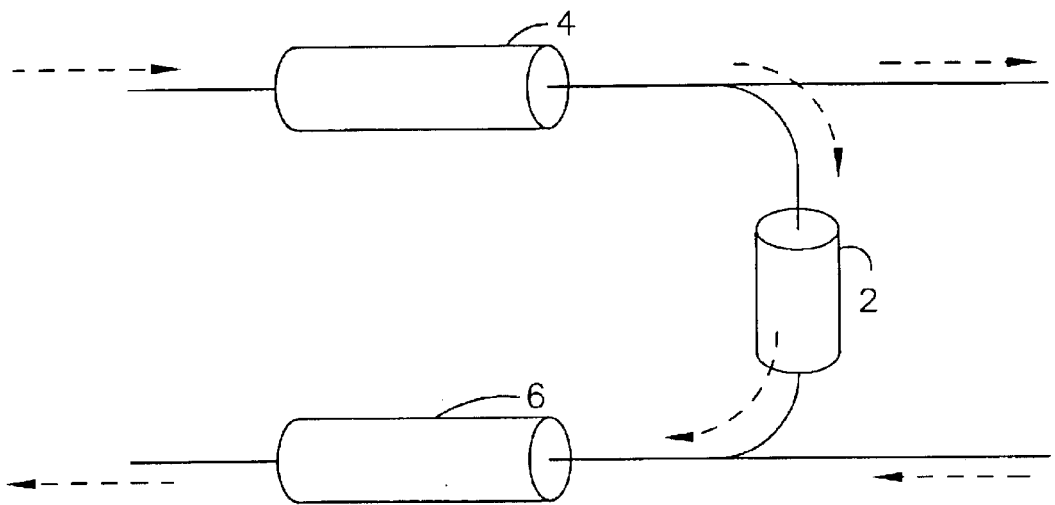
FIG. 2 is a schematic view of a segment of a sonar array.
Figure 3:
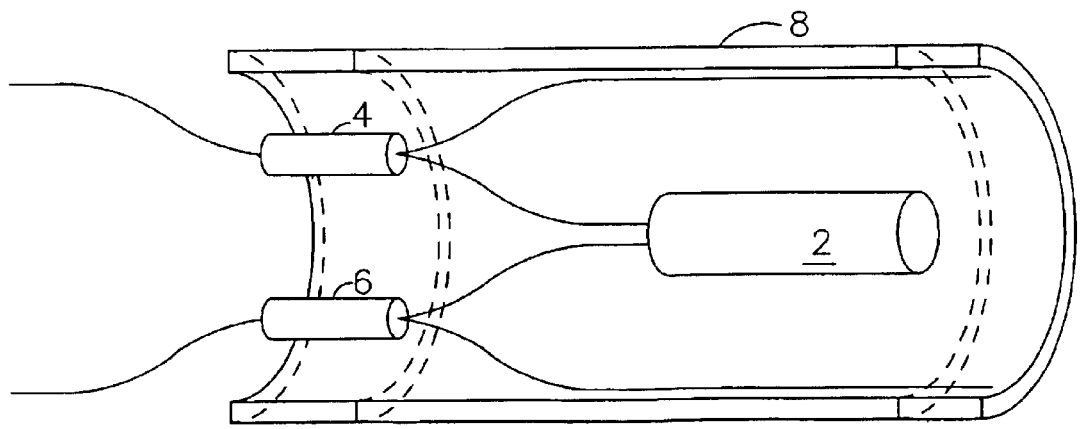
FIG. 3 is a schematic view of a segment of an interferometer array within a down hole monitoring hose.

FIG. 1 is a schematic drawing of an interferometer 2 such as a Mach Zhender interferometer, such as might be used in a hydrophone or sonar array for the detection of acoustical information. Such sensors are among the most sensitive known. FIG. 2 shows the interferometer connected between a pair of optical couplers 4, 6 as a segment of a hydrophone array. FIG. 3 shows the segment of the array positioned within a flexible tube or hose 8. The tube 8 would typically house many other segments (not shown) and might also carry a number of interconnecting optical fibers, electrical conductors, optical components such as optical amplifiers.

The hose 8 might be deployed in a drill hole for oil that is potentially thousands of feet in length or towed behind a ship or deployed as a stationary array on the bottom of a sector of the ocean. In each such application, the optical and electronic components within the hose must be protected from extremes of hydrostatic or hydraulic pressures and in the case of down hole applications, from high temperatures approaching 200 degree centigrade.

Figure 4:
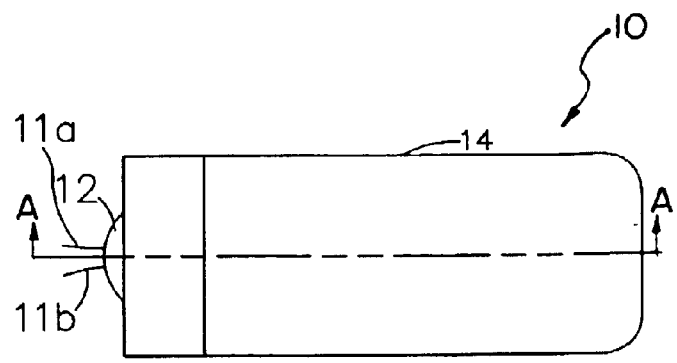
FIG. 4 is an elevation view of a pressure vessel having a single plug.

FIG. 4 is an elevation view of the pressure vessel 10. The invention "Improved Pressure Vessel" of FIG. 4 and its alternative embodiments in the figures subsequent to FIG. 4 are for a pressure vessel capable of withstanding elevated hydrostatic pressures, and elevated temperature. The pressure vessel 10 provides a protected envelope for a variety of components such as fiber optic components including items such as optical couplers, wavelength dependent multiplexers, multi-function integrated optical components, interferometers such as Mach-Zhender and Michelson types, optical sources, optical amplifiers and electronic components for signal conditioning and acquisition as the application might require. In such applications, the components are kept at atmospheric pressure. The leads, electrical or optical are sealed in a plug at the ends of the vessel. In down-hole applications, the hose or tube 8 of FIG. 3 has an inside diameter that imposes a budget on the outside diameter of any pressure vessels used for components within its interior. A typical maximum diameter for a pressure vessel might be slightly less than 0.2 inches for a down hole application.

Fiber optic leads or pigtails 11a and 11b exit cap 12. The pressure vessel 10 has a tubular casing 14, typically fabricated from steel that is capable of withstanding extreme hydrostatic pressures.

Figure 5:
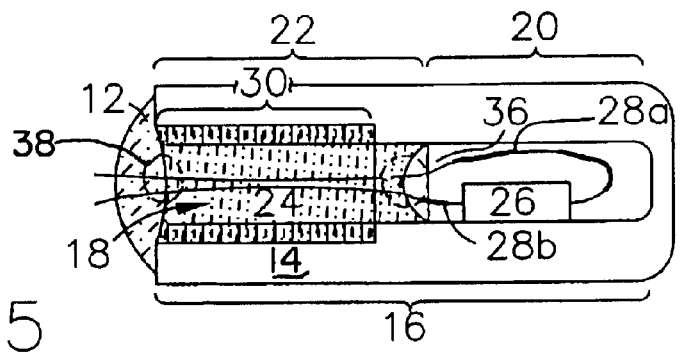
FIG. 5 is a sectional view of a first embodiment of the pressure vessel of FIG. 4 taken on line A—A.

FIG. 5 is a sectional view of a first embodiment of the pressure vessel 10 taken on section line A—A of FIG. 4. FIG. 5 shows that tubular casing 14 has an internal cavity 16 and with an opening 18 in at least one end. The length of the internal cavity 16 is shown by a bracket 16 below the internal cavity. In the embodiment of FIG. 5, the opening 18 is at the left end of the tubular casing 14. The opening 18 permits access to said internal cavity 16. The internal cavity 16 has a hollow interior identified by bracket 20, and a plug region, having a position and length identified by bracket 22. The plug region is near the opening 18. A plug 24 is shown filing the plug region 22. Block 26 represents an electrical or optical component in the hollow interior 20. The component 20 has at least a first lead 28a, 28b passing through said plug to exit the pressure vessel as leads 11a, 11b. The plug 24 is shown encapsulating, the component leads 28a, 28b as they pass through the plug region to the opening 18 and the plug 24 seals the opening 18.

Figure 6:
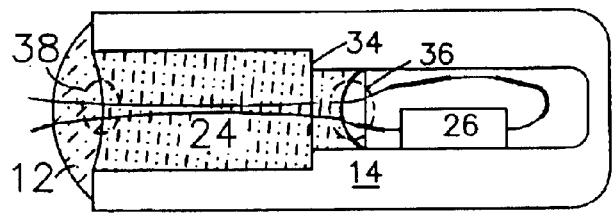
FIG. 6 is a sectional view of a second embodiment of the pressure vessel of FIG. 4 taken on line A—A.
Figure 7:
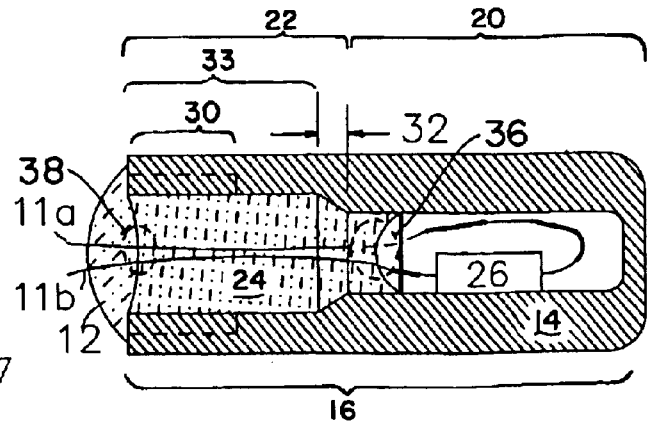
FIG. 7 is a sectional view of a third embodiment of the pressure vessel of FIG. 4 taken on line A—A.

As shown in FIGS. 5–7, the plug 24 is cast within the plug region 22 of the tubular casing 14 of a hard incompressible material such as a loaded epoxy resin or a ceramic adhesive. The plug 24 is circular in cross section because the tubular casing 14 is circular in cross section. It should be understood, that circular cross section tubing has an advantage over other form factors at high pressure; however, if pressure and size permitted, alternative form factors could be used such as rectangular or triangular depending on the application and the requirements.

In the embodiments of FIGS. 5 and 6, the plug region has an irregular surface region identified by bracket 30 for frictionally engaging the plug. The irregular region is typically threaded, however, the surface might be improved for bonding using a chemical etch or by abrasive sanding or blasting.

FIG. 7 is another alternative embodiment. A plug 24 is cast in the internal cavity 16 plug region 22 in which at least a portion of the plug region 22 has a necked down region identified by bracket 32 as having a cross section diminishing in diameter with distance from the opening 18. The internal cross section of the internal cavity 16 has a first enlarged region 33 along a first portion of the plug region 22. The plug region is then shown necked down in diameter along the necked down region 32 of the plug region 22. The necked down region 32 is followed by the hollow interior identified by bracket 20. The function of the necked down region is to drive the material of the plug into compression as the external hydrostatic pressure on the vessel increases. The diminishing portion or necked down region prevents the plug from moving into the hollow interior 20. Shoulder 34 in FIG. 6 provides a similar function. In the embodiment of FIG. 7, the plug region is shown to be necked down to a diameter that is a match for the diameter of the hollow interior 20 circular cross section. The irregular surface region 30 is shown positioned within the first enlarged region 33.

In each of the embodiments, of FIGS. 5–7 and 9–10, the lead exiting the opening is at least a first optical fiber having an optical core covered by optical cladding. The cladding is covered by a protective plastic jacket. The jacket over the cladding is treated to remove the jacket over the desired portion using chemical or mechanical methods. The jacket is removed from a portion of the lead after the lead leaves the component. The portion of the jacket to be removed begins at phantom ellipse 36, and continues through a portion passing through the plug 24 to a point just below the outer surface of the plug identified by ellipse 38. The jacket is removed to permit the plus material to bond to the surface of the cladding which further perfects the hydraulic seal.

The cap 12 is formed from a polymer material to cover and extend beyond the external surface of the plug 24 thereby forming a fluid barrier over the surface of the plug 24. Liquid Viton, a fluorocarbon elastomer, a rubber-like material, that holds at high temperature, is applied to the top or exposed surface of the ceramic adhesive to form cap 12.

Figure 8:
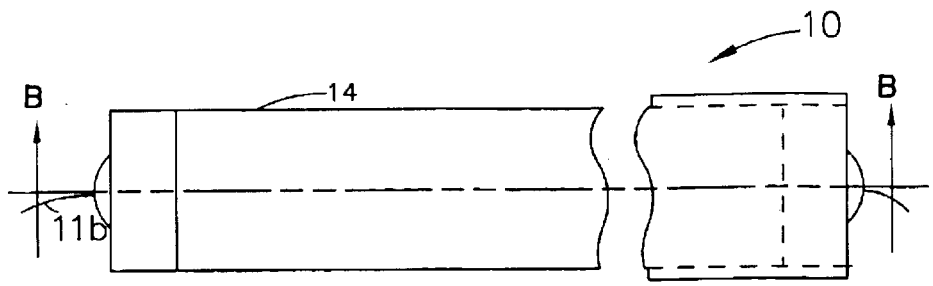
FIG. 8 is an elevation view of a pressure vessel having a first and second plug.

FIG. 8 is an elevation view of the pressure vessel 10 having two openings in the tubular casing 14. The openings at the left and right ends permit access to the hollow interior 20, the extent of which is identified by bracket 20 in FIG. 9, a sectional view taken on line B—B of FIG. 8. The internal cavity 16 has a hollow interior identified by bracket 20.

Figure 9:
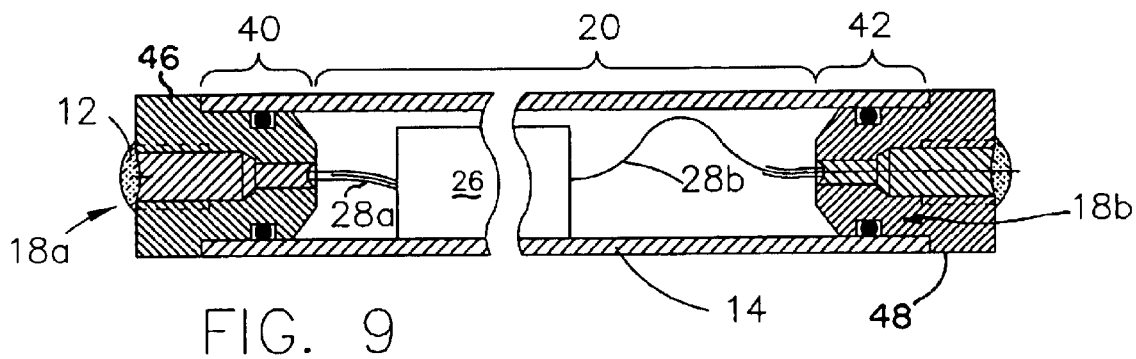
FIG. 9 is a sectional view of a first embodiment of the pressure vessel of FIG. 8 taken on line B—B showing a first and second plug and O-rings being used on each plug.
Figure 10A:
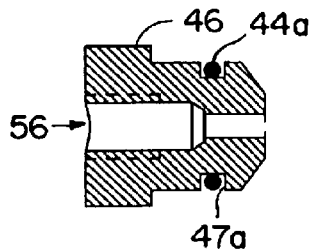
FIG. 10a is a sectional view of the first plug on the left of FIG. 9 using an O-ring with the ceramic plug removed.
Figure 11B:
FIG. 11b is a sectional view of the first ceramic plug of FIG. 9.
Figure 11A:
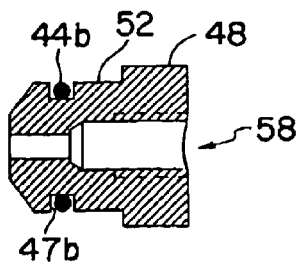
FIG. 11a is a sectional view of the second plug on the right of FIG. 9 using an O-ring with the ceramic plug removed.

FIG. 9 shows a first and second cylindrical plug 46, 48 more clearly identified in FIGS. 10a and 11a respectively. The first and second plugs are force fit via first and second plug region or internal cavity openings 18a and 18b into first and second plug regions identified in FIG. 9 by brackets 40 and 42 in the tubular casing 14. A component 26 is shown in the hollow interior 20. The component has at least a first and or a second lead 28a, 28b.

Each plug has an outer cylindrical surface 50, 52, the respective outer cylindrical surface 50, 52 of each plug is force fit via the plug region opening 18a, 18b of the cylindrical casing 14 into respective first and second plug regions 40, 42.. As shown in FIGS. 10a and 11a, each plug 46, 48 has a through-hole 56, 58 that receives and passes at least the component first and or second lead 28a, 28b to a position outside of the pressure vessel 10. Each plug also has a first O-Ring 44a, 44b to create a seal between the inner wall of the tubular casing 14 and the respective cylindrical plug outer cylindrical surface 50, 52.

Figure 10B:
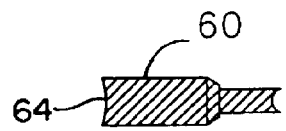
FIG. 10b is a sectional view of the first ceramic plug of FIG. 9.

As shown in FIGS. 10b and 11b, plugs 46, 48 each further comprise a first and second ceramic adhesive plug 60, 62 formed in the respective through-hole 56, 58 by inserting ceramic adhesive into the through-hole and filling substantially all of the void space within the through-hole not occupied by the lead or leads. The adhesive is allowed to encapsulate the respective lead passing through the through the respective hole 56, 58 thereby sealing the opening 18a. 18b.

In alternative embodiments of FIGS. 10a, 10b a portion of the hole is increased in diameter and then at least a portion of the plug region has a cross section that diminishes in diameter with distance from the opening.

Figure 12:
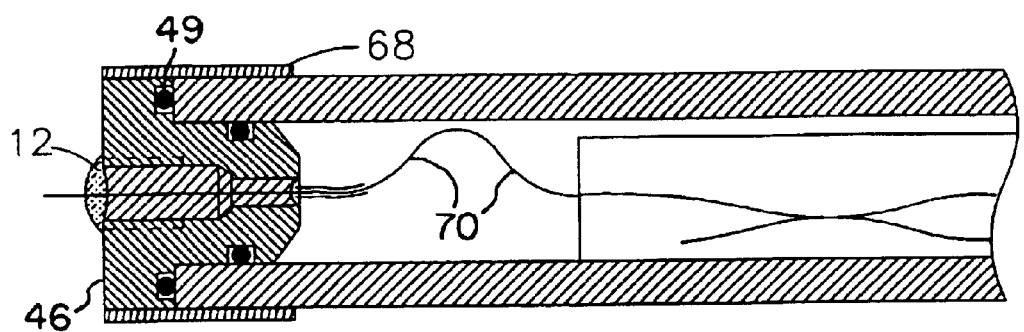
FIG. 12 is a sectional view of a second embodiment of the pressure vessel of FIG. 8 taken on line B—B showing a first and second plug, each using first and second O-rings.

Referring to FIGS. 9 and 12, the leads 28a, 28b exiting the opening 18a, 18b are at least a first optical fiber having a plastic jacket covering the cladding. The plastic jacket of the optical fiber passing through the through-hole is treated to remove a portion of the jacket as discussed above in connection with FIGS. 5–7 and reference numbers 36, 38.

In the embodiments of FIGS. 9–12, the through-holes 56, 58 in the first and second cylindrical plugs 46, 48 have an inner surface. A portion of each inner surface identified by dash lines in FIGS. 9, 10a and 11a is formed to have an irregular or roughened surface region for improved bonding with the ceramic adhesive plug. The irregular surface of the through-hole is a functional equivalent to the irregular surface region 30 in FIG. 5 under bracket 30.

The embodiments of FIGS. 9 and 12 each have an end cap 12 over the outer surface of the ceramic adhesive plug formed in the through-hole. The cap is formed from a polymer material to encapsulate the exposed cladding and to cover and extend beyond the external surface identified in FIGS. 10b and 11b as 64, 66 of the ceramic adhesive plug thereby forming a fluid barrier over the surface of the plug.

In assembling an optical component into the pressure vessel, the leads are first treated to remove the necessary jacket material. The component is then inserted into the tubular casing 14 with care exercised to insure that a sufficient strain relief is provided for the fiber optic pigtails and to ensure that the bend radiuses are sufficient to prevent unwanted evanescent radiation. This step is critical when the fiber is required to exit the component in one direction and reverse its direction within the pressure vessel. In an application where the pressure vessel is limited in size to under 0.2 inches, leads exiting a component might have to exit the pressure vessel at opposite ends of the vessel to avoid excessively sharp bends.

A strain relief in the optical fiber is also necessary to protect the component from strain that results from the thermal expansion of the steel tubular casing 14 over a temperature rise to 200 degrees C. The length of the fiber strain relief on the right and left sides of component 26 are basically the same. It is important that the strain reliefs are sufficiently compliant, so that as the temperature changes and the steel expands or as pressure forces contraction, the fiber is not torn out of the component.

FIG. 12 shows plug 62 using a second O-ring 64. The plug 62 extends beyond ends of the tubular casing 14 and is increased in diameter to form a cap lip that is driven against the edge of the tubular casing with increasing pressure.

FIGS. 8 and 12 show the use of shrink tubing 68 over the end of the lip and the tubular casing to improve the seal of the joint formed at the interface of the lip and the end of the tubular casing, with increasing pressures.

Components within can be a three or four fiber coupler or even an MIOC with modulator wires. The wires could pass through the hole in the plug with the fibers. The ceramic adhesive would then be forced into the hole to fill the void space around the fibers and or wires passing through the hole to form the ceramic adhesive plug. The ceramic adhesive is slightly porous. The Viton cap seals the porous surface of the ceramic plug. As pressure is increased, the walls of the cylindrical body strain inward but the increasing pressure forces the plug into the cap forming an even tighter seal around the fibers.

The component or device in the package can be immobilized by bonding it to the inner wall of the body or filling a portion of the void in the body with a Styrofoam or other material. The void is at atmospheric pressure.

If the jacket can take the temperature, then the jacket is left on the fiber. If the application temperature is too high for the jacket material, then the jacket material is removed by mechanical or chemical means.

The invention high-pressure vessel is the first to address the needs of the oil industries for a sensor that will withstand 10,000 psi and a temperature up to 200 degrees. No coupler produced before can meet the requirements imposed by the down-hole drilling application. Slight movement of the fibers does not change the performance of the coupler. Temperature change does change the performance of the coupler. The gases and chemicals in the hole can destroy the coupler. This package protects the coupler from those materials.

The pressure vessel 10 package is typically placed in a liquid filled hose such as the hose 8 depicted in FIG. 3. The hose is filled with a material similar to transformer oil. The hose is armored and sealed. The oil filling the hose prevents it from collapsing. The region in the hose in which the component is positioned has a hydrostatic pressure roughly equivalent to that of the region outside of the hose. The couplers are used with sound sensors such as Mach-Zehnder or Michelson interferometers that are outside of the package, however, if protection for these components is required in alternative application, the invention package can be adapted to accommodate the requirement of the larger component. Four couplers are typically used with each interferometer. Two are used with the sensor and two more with the telemetry. When an array of sensors are used, two couplers are used with each sensor.

More than one coupler can be placed in a single package if the size of the package was not limited. In the present embodiments, the diameter of the package was limited, so that only one coupler could fit into a package.

Referring again to FIG. 12, if the strain relief 70 is coiled, the radius of the bend must be large enough to prevent evanescent light from escaping through the cladding. A hose used in a test of the subject pressure vessel 10 had a one-inch inside diameter. The outside diameter of the pressure vessel was limited to 3/16 inches. The vessel length was limited to 2 1/8 inches. The inside diameter of the body was 0.118 inches. The wall thickness was 0.035 inches. The steel used was 4130. It proved to have the strength necessary to enable the vessel to pass the deformation test at 10,000 psi. It was the strongest standard tubing that was conveniently available. The cap was made of the same material. Thermal expansion was matched to that of the tubular casing in that way. Other materials could be used but at additional expense.

Any material suitable for the environment and stress could be used with the necked down, threaded hole, the ceramic adhesive and the Liquid Viton elastomer covering for the end of the exposed ceramic adhesive. The ceramic adhesive attached to the walls of the tapered hole but also to the glass cladding of the fiber. Epoxy materials would not work at 200 degrees centigrade and at 10,000 psi. The ceramic adhesive is like concrete or Portland cement. A ceramic adhesive such as that produced by Cotronics, was located at page 2498 in McMaster-Carr catalog.

What is claimed is:

1. An improved pressure vessel comprising:
    a tubular outer casing capable of withstanding high temperature and pressure environments having a substantially cylindrical internal cavity and an opening in at least one end permitting access to said internal cavity, the opening including a plug region having a greater diameter than the diameter of the internal cavity along at least a part of its length, the plug region extending from the opening to the internal cavity;
    a component in the internal cavity having at least a first lead required to exit the pressure vessel; and
    a high temperature, high pressure-resistant pressure-fit ceramic adhesive plug sealing against a length of the first lead passing through the plug shaped to conform to the plug region and sealing the opening when located therein, whereby increased external pressure compresses the plug forcing it towards the internal cavity increasing the seal around the lead and around the plug region.

2. The pressure vessel of claim 1 wherein said pressure vessel further comprises: a cap formed from a polymer material, said cap extending beyond the external surface of said plug thereby forming an additional fluid barrier over the surface of the plug.

3. A pressure vessel capable of withstanding extreme hydrostatic pressure and elevated temperatures, comprising:
    a tubular outer cylindrical casing capable of withstanding external hydrostatic pressures and elevated temperatures having a substantially cylindrical hollow interior and an opening in at least one end permitting access to the hollow interior;
    a component in the hollow interior having at least a first lead required to exit the tubular casing;
    an end plug having an outer cylindrical surface adapted to force fit in the opening of the cylindrical casing, the end plug having a through-hole through its length with a cross-section at least along a part of its length that diminishes in diameter with distance from the opening of the cylindrical casing; and a ceramic adhesive plug sealing against a length of the first lead passing through the through hole of the end plug shaped to conform to the through-hole in the end plug filling substantially all of the void space within the through-hole not occupied by the lead, thereby sealing the through-hole in the end plug, whereby increased external pressure compresses the ceramic adhesive plug forcing it towards the internal cavity increasing the seal around the lead and around the through-hole in the end plug.

4. The pressure vessel of claim 3 wherein the end plug is formed of steel and has an O-ring positioned in a channel machined in the plug to receive the O-ring, the O-ring and channel being adapted to provide a seal between the outer cylindrical surface of the end plug and the opening of the cylindrical casing.

5. The pressure vessel of claim 4 wherein the through-hole of the end plug is circular in cross section, and the lead exiting the opening is at least a first optical fiber having a plastic jacket covering the cladding, the plastic jacket on the optical fiber length passing through the through-hole being removed, thereby exposing the cladding, permitting a better seal between the ceramic adhesive plug and the optical fiber.

6. The pressure vessel of claim 5 further comprising:

a cap formed from a polymer material to encapsulate the exposed cladding and to cover and extend beyond the ceramic adhesive plug thereby forming a fluid barrier over the surface of the plug.

7. The pressure vessel of claim 4 wherein the through-hole has an inner surface with at least a portion being formed to have an irregular surface region for improved bonding with the ceramic adhesive plug.

8. A pressure vessel capable of withstanding elevated hydrostatic pressures and elevated temperatures comprising:

a tubular outer cylindrical casing capable of withstanding extreme hydrostatic pressures having a substantially cylindrical hollow interior and a first and second opening at each end permitting access to said hollow interior;

an optical component in said hollow interior having at least a plurality of optical fiber pigtails extending from the optical component;

a first and second end plug in the respective first and second opening, each end plug having an outer cylindrical surface adapted to force fit into its respective opening of the cylindrical casing, at least one end plug having a through-hole through its length with a cross-section at least along a part of its length that diminishes in diameter with distance from an opening of the cylindrical casing; and a ceramic adhesive plug sealing against a length of the optical fiber pigtails passing through the through-hole of the end plug shaped to conform to the through-hole in the end plug filling substantially all of the void space within the through-hole not occupied by the optical fiber pigtails, thereby sealing the through-hole in the end plug.

9. The pressure vessel of claim 8 wherein the tubular cylinder casing and the first and second plugs are formed of steel and wherein the optical fibers exiting the opening are at least a first and second optical fiber having a plastic jacket covering the cladding, the plastic jacket on the optical fiber length passing through the through-hole being removed thereby exposing the cladding permitting a better seal between the ceramic adhesive plug and the optical fiber.

10. The pressure vessel of claim 9 wherein the through-hole has an inner surface with at least a portion being formed to have an irregular surface region for improved bonding with the adhesive plug.

11. The pressure vessel of claim 9 further comprising:

a cap formed from a polymer material to encapsulate a small portion of exposed cladding extending from the adhesive plug thereby forming a fluid barrier over the surface of the plug.

* * * * *